UNITED STATES PATENT OFFICE.

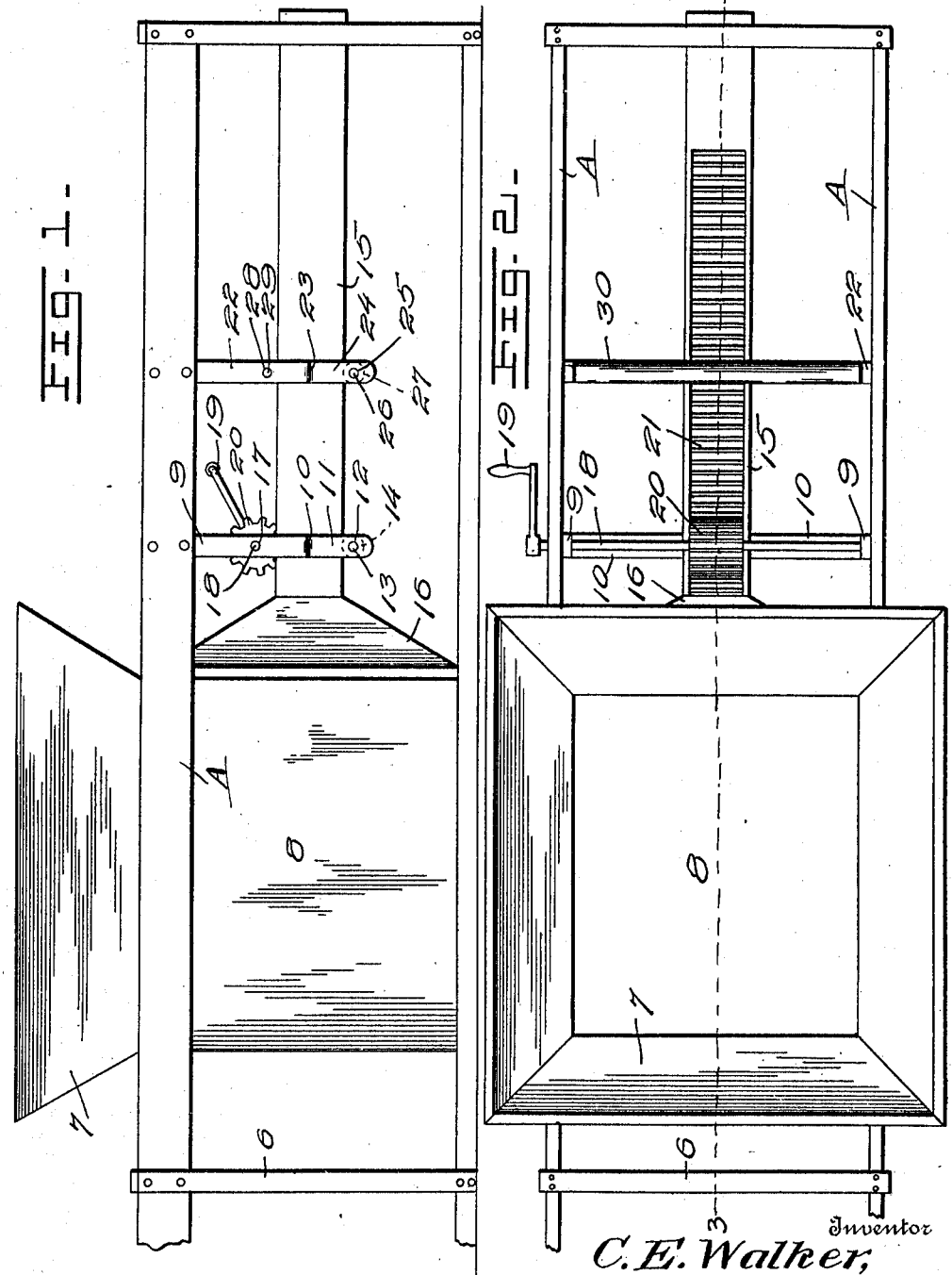

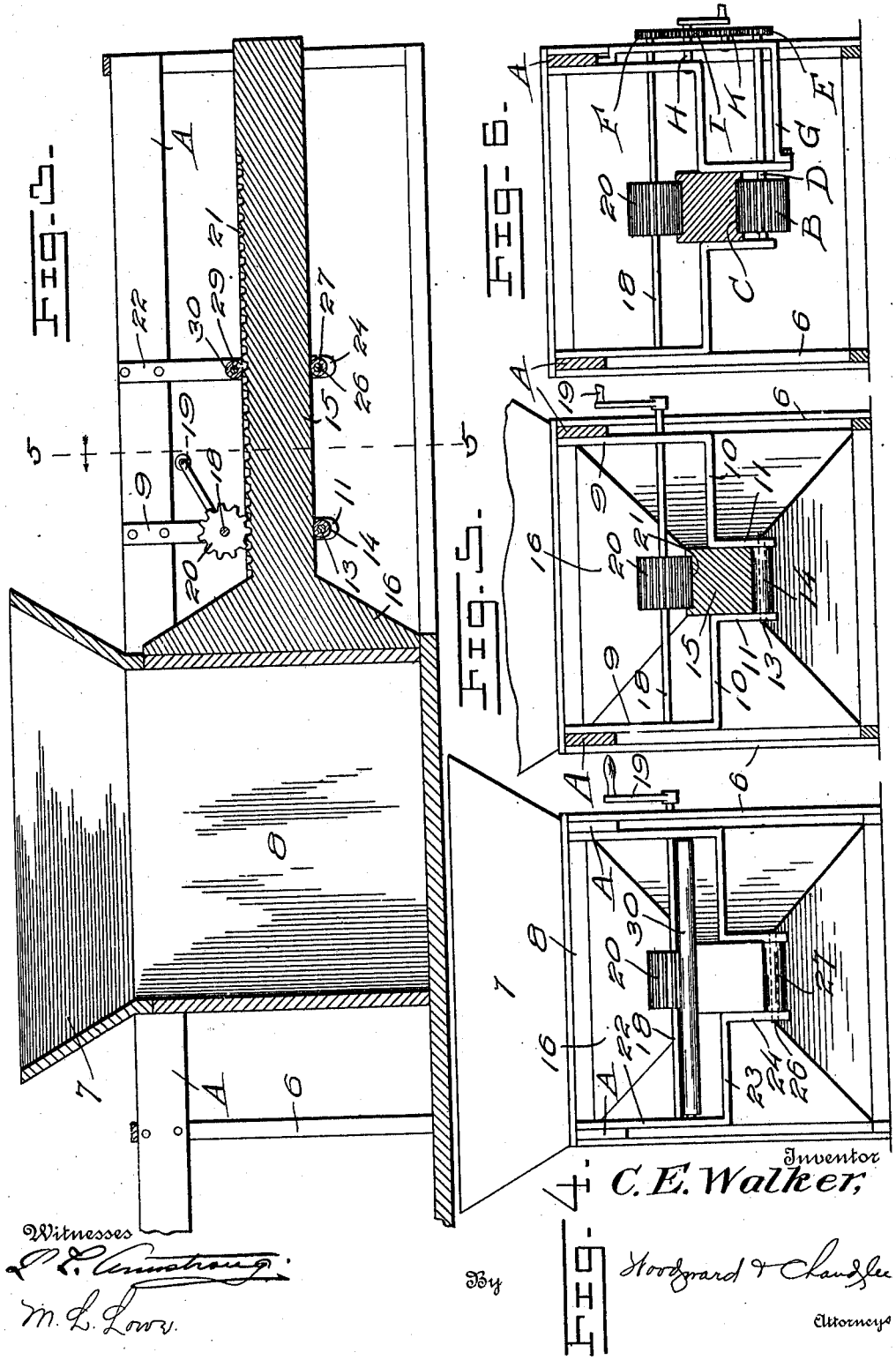

CHARLIE E. WALKER, OF DAINGERFIELD, TEXAS.

BALING-PRESS.

974,319.  Specification of Letters Patent.  Patented Nov. 1, 1910.

Application filed February 11, 1910. Serial No. 543,256.

*To all whom it may concern:*

Be it known that I, CHARLIE E. WALKER, a citizen of the United States, residing at Daingerfield, in the county of Morris and State of Texas, have invented certain new and useful Improvements in Baling-Presses, of which the following is a specification.

This invention relates to hay balers, and has for its object to provide a hay baler which may be operated by manual power to compress hay into bales with the expenditure of a relatively small amount of energy on the part of the operator.

The principal object of the invention is to provide a baling press which will be simple and cheap, and to that end to produce an arrangement of parts including brackets performing the double function of supporting the bearing members of the plunger, and guiding the plunger.

Other objects and advantages will be apparent from the following description, and it will be understood that changes in the specific structure shown and described may be made within the scope of the claims without departing from the spirit of the invention.

In the drawings forming a part of this specification, and in which like numerals of reference indicate similar parts in the several views, Figure 1 is a side elevation of a hay baler constructed in accordance with the present invention, Fig. 2 is a top plan, Fig. 3 is a longitudinal section on the line 3—3 of Fig. 2, Fig. 4 is a rear elevation showing the rearward brackets, Fig. 5 is a section on line 5—5 of Fig. 1, taken between the brackets and looking forwardly to show the forward bracket. Fig. 6 is a modification of the means for adjusting the plunger.

Referring now to the drawings, there is shown a hay baler comprising the usual rectangular frame 6, having the feed hopper 7 and the baling chamber 8. Rearwardly of the baling chamber the upper horizontal members A of the frame have secured thereto a pair of brackets 9 which are disposed directly opposite to each other, and which extend downwardly from the members A and therebelow are bent inwardly as shown at 10 to produce horizontally alined portions, and are then bent downwardly as shown at 11 to form vertically disposed parallel portions.

The portions 11 have registering openings 12 therein, and these openings receive the ends of a horizontally disposed pin 13, upon which there is revolubly engaged a roller 14. This roller is located an appreciable distance below the upper ends of the portions 11, so that there is a space between these portions above the roller and slidably disposed in this space and upon the roller 14, there is a longitudinally movable plunger 15 having a follower head 16 at its forward end.

A pair of horizontally alining openings 17 are formed in the brackets 9 directly below the members A, and these openings 17 receive a horizontally disposed shaft 18 which extends laterally beyond the side of the frame at one end, and which is there provided with an operating crank 19.

The shaft 18 lies in a plane spaced above the upper face of the plunger 15, and carries a gear wheel 20, which meshes with rack teeth 21 formed upon the upper surface of the plunger. It will thus be observed that when the shaft 18 is rotated by means of the crank 19, the gear 20 will be operated to feed the plunger toward and away from the baling chamber 8.

In order to assure the proper movement of the plunger and to prevent the tipping of either of its ends out of a horizontal plane, a steadying device is provided for the rearward portion of the plunger. This device consists of a pair of brackets 22 which are secured to the members A of the frame adjacent to their rearward ends and which extend downwardly as shown. Adjacent to their lower ends, the brackets 22 are bent inwardly as shown at 23 to form portions corresponding to the portions 10 of the brackets 9, and are then bent downwardly as shown at 24 correspondingly to the portions 11. The portions 24 are provided with alining openings 25 receiving a pin 26 upon which there is mounted a roller 27 in a common parallel plane with the roller 14. This roller 27 receives thereupon the rearward end of the plunger 15, which thus prevents downward slipping of the rearward portion of the plunger.

A pair of horizontally alining openings 28 are formed in the brackets 22 above the portions 23, and the openings 28 receive a horizontal pin 29, having mounted thereupon a roller 30. This roller receives the upper surface of the plunger 15 thereagainst, and prevents upward tipping of the rearward end of the plunger.

In the modified form of the invention, the roller 14 is omitted, and the portions 11 are extended downwardly and have mounted therebetween a second gear B, this gear meshing with rack teeth C on the under face of the plunger. This gear B is mounted upon a shaft D which extends outwardly and which carries a gear E. The crank 19 is omitted, and the shaft 18 carries a gear F. A bearing bracket G is carried by the bracket 9 and lies between the outwardly extending portions of the shafts 18 and D and has a small shaft H journaled therein. This shaft H carries a gear I which meshes directly with the gear F and which is connected with the gear E by means of an intermediate small gear K journaled upon the bearing bracket G. The two shafts 18 and D are thus geared to rotate in opposite directions and feed the plunger between the two gears B and 20.

What is claimed is:

1. In a baling press, the combination with a frame including parallel horizontal top members, of a pair of supporting brackets secured to the top members in alinement with each other transversely of the frame, said brackets including vertically extending upper portions, inwardly projected horizontal intermediate portions, and vertically extending downwardly directed lower portions, said lower portions being disposed in parallel relation centrally of the frame, a supporting roller journaled between the said vertical lower end portions of the brackets, said lower end portions extending upwardly beyond the supporting roller to form a plunger guide, a plunger snugly disposed between the said lower vertical portions of the brackets and resting upon the supporting roller, said plunger extending above the horizontal intermediate portions of the brackets, a horizontal shaft journaled in the upper portions of the brackets, a gear carried by the said shaft, a rack carried by the upper side of the plunger and meshed with the gear, and means for revolving the shaft.

2. In a baling press, the combination with a frame including parallel horizontal top members, of a pair of supporting brackets secured to the top members in alinement with each other transversely of the frame, said brackets including vertically extending upper portions inwardly projected horizontal intermediate portions, and vertically extending downwardly directed lower portions, said lower portions being disposed in parallel relation, centrally of the frame, a supporting roller journaled between the said vertical lower end portions of the brackets, said lower end portions extending upwardly beyond the supporting roller to form a plunger guide, a plunger snugly disposed between the said lower vertical portions of the brackets and resting upon the supporting roller, said plunger extending above the horizontal intermediate portions of the brackets, a horizontal shaft journaled in the upper portions of the brackets, a gear carried by the said shaft, a rack carried by the upper side of the plunger and meshed with the gear, means for revolving the shaft, a second pair of similarly formed brackets secured to the top members of the frame rearwardly of the first named brackets, a supporting roller journaled between the lower ends of the vertical lower portions of the second named brackets, said plunger being disposed upon the said second named roller, and a third roller journaled between the upper portions of the said named brackets and resting upon the upper surface of the plunger.

In testimony whereof I affix my signature, in presence of two witnesses.

CHARLIE E. WALKER.

Witnesses:
W. F. MOORE,
C. M. HENDERSON.